(12) United States Patent
Müller et al.

(10) Patent No.: US 11,703,168 B2
(45) Date of Patent: Jul. 18, 2023

(54) PRESS FITTING FOR A PIPE JOINT AND METHOD FOR ITS MANUFACTURE

(71) Applicant: Uponor Innovation AB, Virsbo (SE)

(72) Inventors: Stephan Müller, Haβfurt (DE); Rainer Dittmar, Schweinfurt (DE); Jörg Clauβen, Havixbeck (DE); Maik Altmann, Zeil am Main (DE)

(73) Assignee: UPONOR INNOVATION AB, Virsbo (SE)

( * ) Notice: Subject to any disclaimer, the term of this patent is extended or adjusted under 35 U.S.C. 154(b) by 0 days.

(21) Appl. No.: 17/049,310

(22) PCT Filed: Mar. 4, 2019

(86) PCT No.: PCT/EP2019/055316
§ 371 (c)(1),
(2) Date: Oct. 20, 2020

(87) PCT Pub. No.: WO2019/201500
PCT Pub. Date: Oct. 24, 2019

(65) Prior Publication Data
US 2021/0364111 A1 Nov. 25, 2021

(30) Foreign Application Priority Data
Apr. 20, 2018 (DE) ...................... 10 2018 109 555.4

(51) Int. Cl.
*F16L 33/207* (2006.01)
(52) U.S. Cl.
CPC ....... *F16L 33/2078* (2013.01); *F16L 33/2075* (2013.01); *F16L 2201/10* (2013.01); *F16L 2201/60* (2013.01)

(58) Field of Classification Search
CPC .............. F16L 2201/10; F16L 2201/60; F16L 33/2076; F16L 33/2078
See application file for complete search history.

(56) References Cited

U.S. PATENT DOCUMENTS

| 1,964,255 A | 6/1934 | Faast |
| 2,051,518 A | 8/1936 | Cunningham |

(Continued)

FOREIGN PATENT DOCUMENTS

| CN | 206419587 U | 8/2017 |
| DE | 20013425 U1 | 12/2000 |

(Continued)

OTHER PUBLICATIONS

U.S. Appl. No. 35/506,496—Notice of Allowance dated Mar. 4, 2020, 9 pages.
(Continued)

*Primary Examiner* — David Bochna
(74) *Attorney, Agent, or Firm* — Haynes Befiel & Wolfeld LLP; Andrew L. Dunlap

(57) ABSTRACT

A press fitting for a pipe connection is provided. The press fitting includes a fitting body for connecting the press fitting to a pipe, a press sleeve fixed to the fitting body and having a substantially cylindrical pressing portion and at least one projecting element which delimits the substantially cylindrical pressing portion in the axial direction, and a tubular banderole which surrounds the substantially cylindrical pressing region of the pressing sleeve, wherein the tubular banderole is arranged rotatably relative to a surface of the pressing sleeve, is held in the cylindrical pressing region by the at least one projecting element and is at least partially destroyed when the pressing sleeve is pressed with a pressing tool.

20 Claims, 7 Drawing Sheets

(56) References Cited

U.S. PATENT DOCUMENTS

| | | | | |
|---|---|---|---|---|
| 3,303,669 | A | * | 2/1967 | Oetiker ............... F16L 33/025 464/88 |
| 3,574,355 | A | * | 4/1971 | Oetiker ............... F16L 33/221 285/39 |
| D311,573 | S | | 10/1990 | Lewis |
| 5,195,788 | A | * | 3/1993 | Oetiker ............... B21D 39/046 285/252 |
| D346,020 | S | | 4/1994 | Kellogg et al. |
| D368,304 | S | | 3/1996 | Morrison |
| D387,146 | S | | 12/1997 | Morrison |
| D407,802 | S | | 4/1999 | Hatfield et al. |
| D602,128 | S | | 10/2009 | Williams et al. |
| D627,039 | S | | 11/2010 | Yu |
| 9,523,451 | B1 | | 12/2016 | Nichols |
| D851,738 | S | | 6/2019 | Ghorbani |
| 2004/0222632 | A1 | * | 11/2004 | Viegener ............. F16L 33/2078 285/256 |
| 2006/0220378 | A1 | * | 10/2006 | Li ......................... F16L 13/143 285/242 |
| 2007/0134980 | A1 | | 6/2007 | Poll et al. |
| 2008/0067809 | A1 | * | 3/2008 | He ....................... F16L 33/2078 285/259 |
| 2009/0218814 | A1 | * | 9/2009 | Kern .................... F16L 13/141 285/382.2 |
| 2010/0117356 | A1 | | 5/2010 | Pucciani |
| 2011/0181038 | A1 | * | 7/2011 | Galle ................... F16L 13/143 285/93 |
| 2012/0097284 | A1 | * | 4/2012 | Hudson ............... B29C 66/7375 138/104 |
| 2015/0130181 | A1 | * | 5/2015 | Kremer ................ F16L 37/248 285/86 |
| 2020/0041052 | A1 | * | 2/2020 | Kuenstel ............. F16L 33/2078 |
| 2020/0378530 | A1 | * | 12/2020 | Schneider ............ F16L 13/141 |

FOREIGN PATENT DOCUMENTS

| | | |
|---|---|---|
| DE | 19945113 A1 | 3/2001 |
| DE | 10002916 C1 | 5/2001 |
| DE | 10233968 C1 | 12/2003 |
| DE | 10233559 B3 | 1/2004 |
| DE | 102004016327 A1 | 11/2005 |
| DE | 202004020993 U1 | 6/2006 |
| DE | 60306297 T2 | 5/2007 |
| DE | 102005062738 A1 | 7/2007 |
| DE | 102006017184 B3 | 11/2007 |
| DE | 602004007749 T2 | 6/2008 |
| DE | 102008036208 A1 | 5/2010 |
| DE | 202010005366 U1 | 7/2010 |
| DE | 202010012981 U1 | 1/2011 |
| DE | 102013203553 B3 | 7/2014 |
| EP | 1081421 A1 | 3/2001 |
| EP | 1477719 A1 | 11/2004 |
| EP | 1571383 A1 | 9/2005 |
| EP | 1790896 A1 | 5/2007 |
| EP | 1933073 A1 | 6/2008 |
| EP | 2019243 A1 | 1/2009 |
| EP | 2643624 B1 | 10/2016 |
| EP | 3159590 A1 | 4/2017 |
| KR | 2004/0080872 A | 9/2004 |
| KR | 2006/0098159 A | 9/2006 |
| KR | 2011/0020415 A | 3/2011 |
| WO | 2004/015322 A1 | 2/2004 |
| WO | 2007/101110 A2 | 9/2007 |
| WO | 2017/043966 A1 | 3/2017 |

OTHER PUBLICATIONS

PCT/EP2019/055316—ISA International Search Report w/English Translation dated Jun. 17, 2019, 5 pages.

PCT/EP2019/055316—ISA Written Opinion w/Google Machine English Translation dated Jun. 17, 2019, 8 pages.

PCT/EP2019/055316—International Preliminary Report on Patentability, dated Oct. 20, 2020, 7 pages.

* cited by examiner

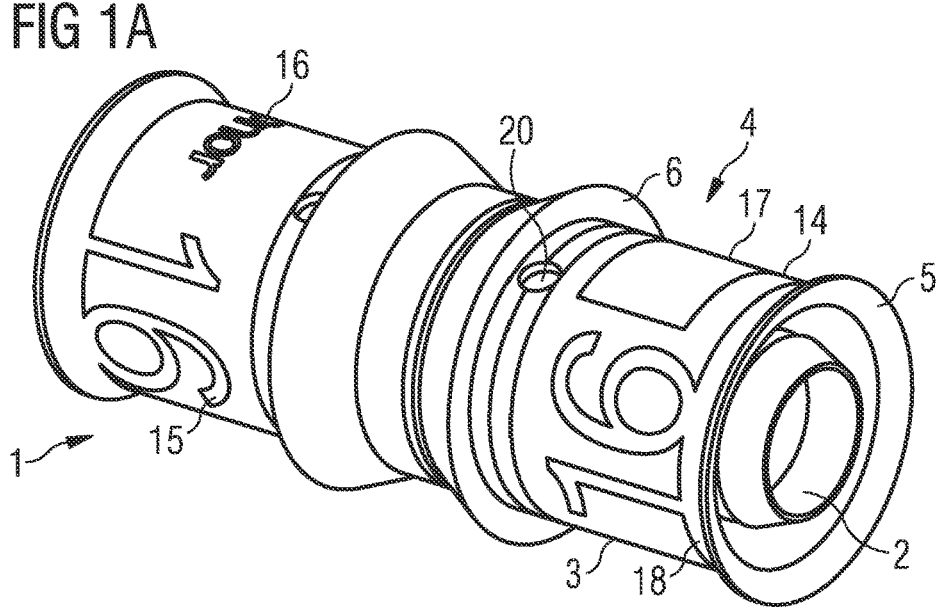
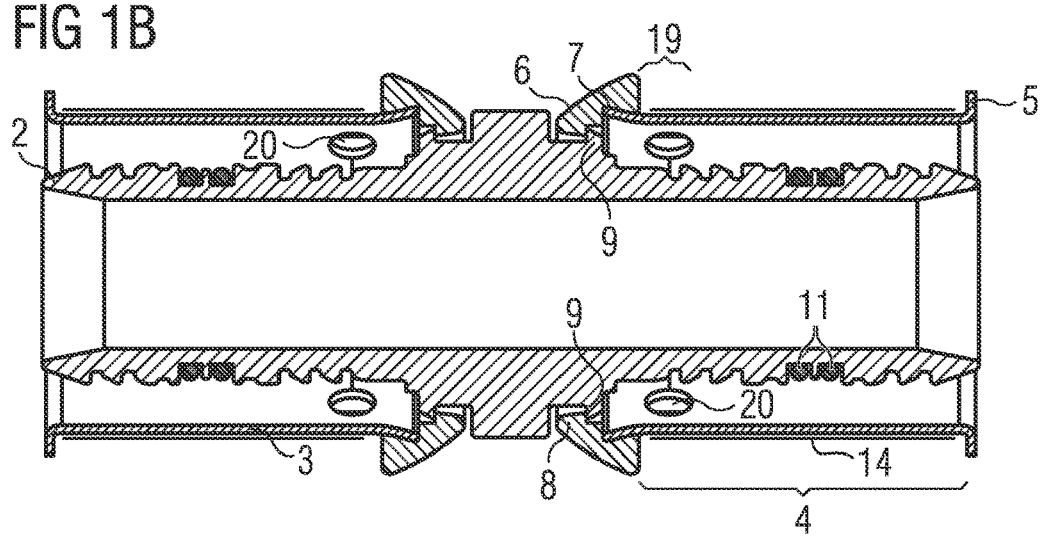
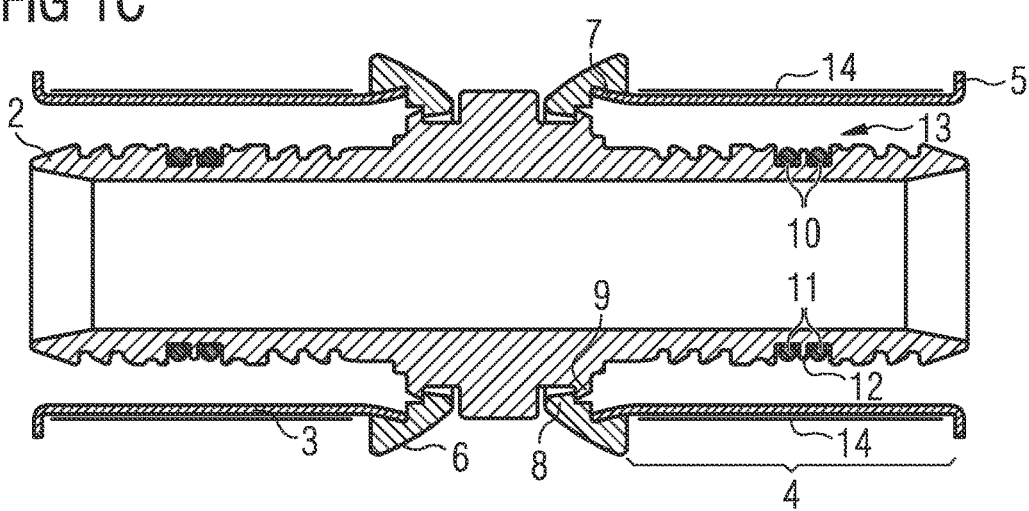

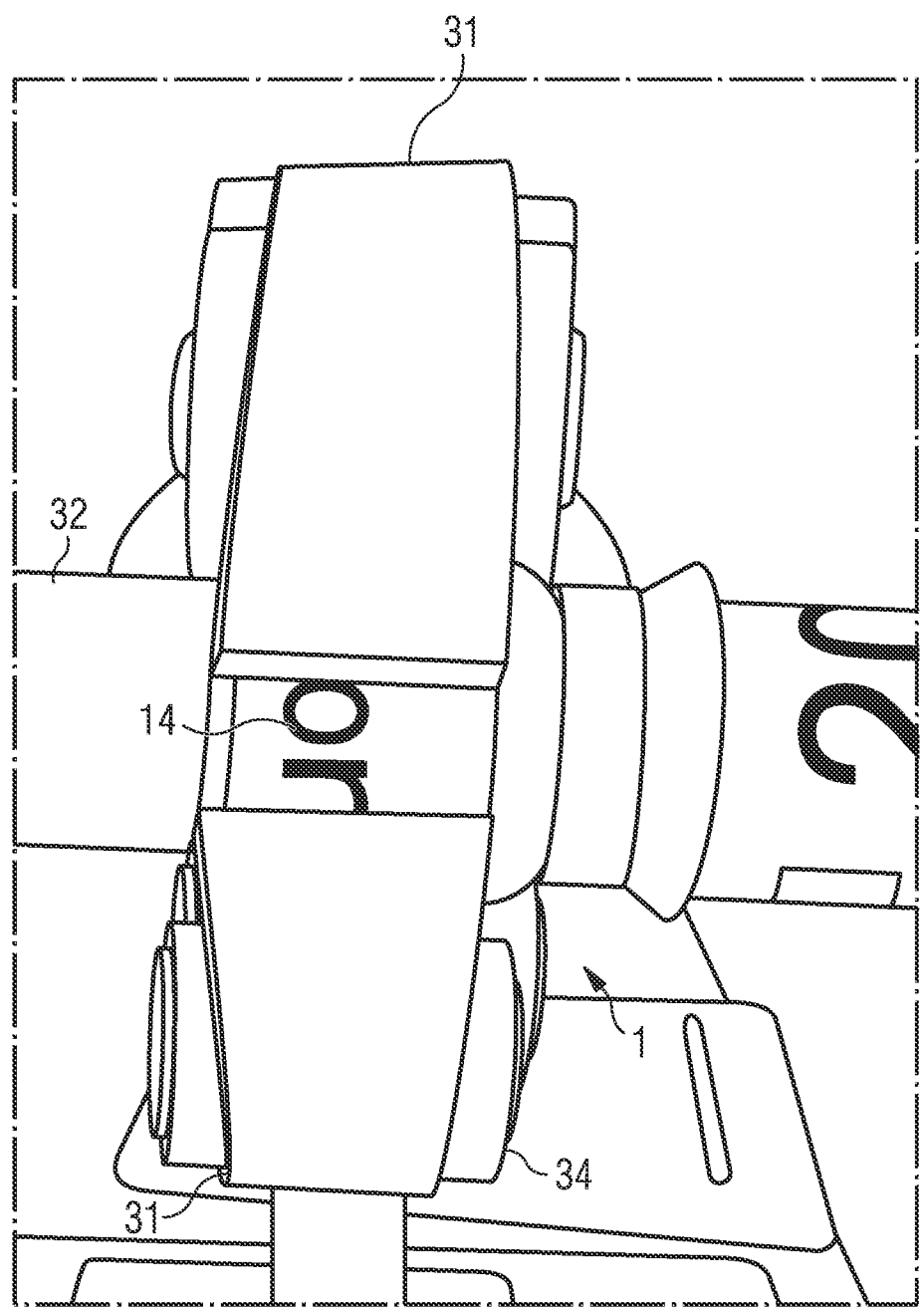

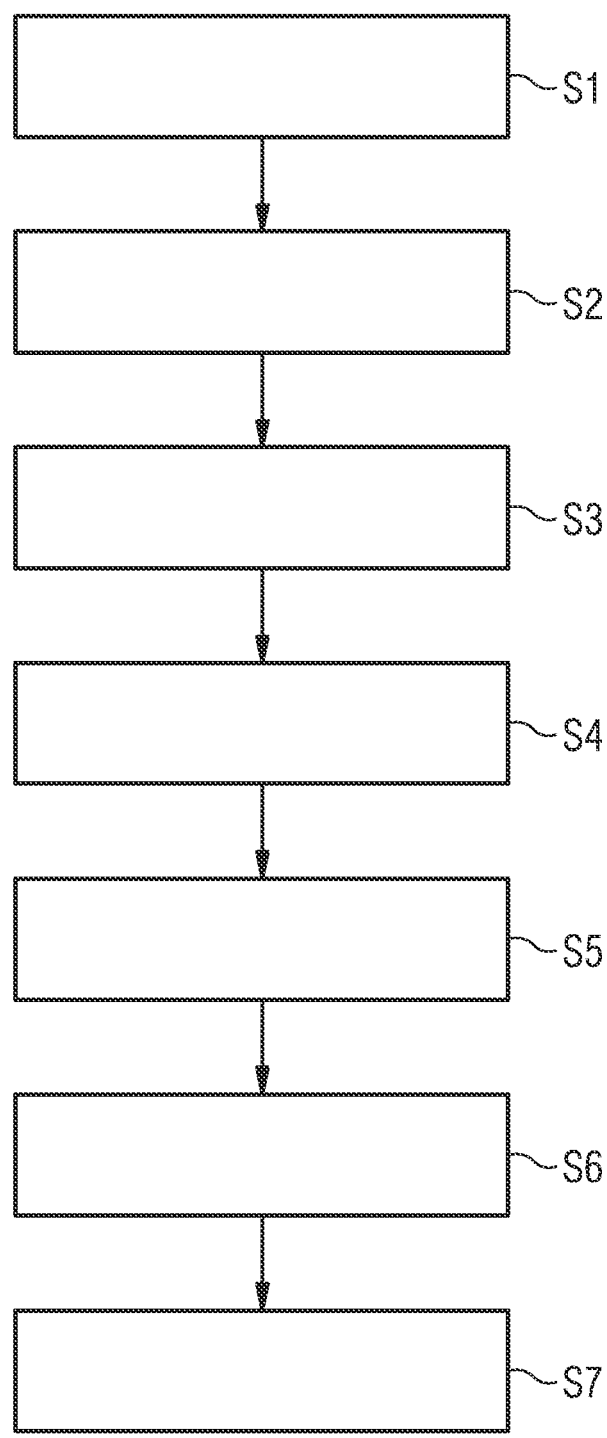

PRESS FITTING FOR A PIPE JOINT AND METHOD FOR ITS MANUFACTURE

CROSS-REFERENCE

This application is the U.S. National Stage of International Application No. PCT/EP2019/055316, filed Mar. 4, 2019, which claims priority to German Patent Application No. DE 102018109555.4, filed Apr. 20, 2018.

DESCRIPTION

The invention concerns a press fitting for a pipe connection comprising a fitting body for connecting the press fitting to a pipe and a press sleeve fixed to the fitting body with a substantially cylindrical pressing area.

Such press fittings are well known from the state of the art. They enable the simple and time-saving production of pipe connections for a variety of applications by means of a suitable pressing tool. For example, gas and water pipes of different diameters can be produced in this way.

The invention concerns a press fitting for a pipe connection comprising a fitting body for connecting the press fitting to a pipe and a press sleeve fixed to the fitting body with a substantially cylindrical pressing area.

Such press fittings are well known from the state of the art. They enable the simple and time-saving production of pipe connections for a variety of applications by means of a suitable pressing tool. For example, gas and water pipes of different diameters can be produced in this way.

The present invention is based on the task of further improving such press fittings. In particular, a particularly slim, material- and space-saving design of such a press fitting shall be described. Furthermore, possibilities are to be specified which enable the indication of a pressing of such a press fitting. Finally, manufacturing processes for the production of such press fittings shall be described.

According to a first aspect of the invention, a press fitting for a pipe connection is described which comprises a fitting body for connecting the press fitting to a pipe and a press sleeve fixed to the fitting body with a substantially cylindrical pressing area and at least one protruding element. The at least one element limits the essentially cylindrical pressing area in axial direction. The press fitting further comprises a tubular banderole, for example made of a plastic film, which surrounds the substantially cylindrical pressing area of the press sleeve, the tubular banderole being arranged rotatably with respect to a surface of the press sleeve, being held in the cylindrical pressing area by the at least one element and being at least partially destroyed when the press sleeve is pressed with a pressing tool.

The provision of a tubular banderole, e.g. made of a plastic film, enables a versatile, simple and particularly space-saving marking of a press fitting. At the same time, such a banderole, which is rotatably arranged in relation to a surface of the press sleeve, can be taken along by the pressing jaws of a pressing tool during a pressing process and at least partially destroyed in the process, which can serve as an indication of successful pressing of the press fitting.

The twistability of the banderole can be produced, for example, by designing and/or arranging the tubular banderole and/or the press sleeve on top of each other in such a way that a static friction between an inner side of the tubular banderole and the surface of the press sleeve is lower than a static friction between an outer side of the tubular banderole and a surface of a press jaw of a pressing tool during pressing. This can be achieved, for example, if the pressing jaw has a relatively rough inner surface and the pressing sleeve has a smooth outer surface. For example, the surface of the press jaws can be roughened and/or the surface of the press sleeve can be smoothed, for example by polishing, barrel finishing or electropolishing. Under these circumstances, the sleeve could comprise a similar surface on both sides with the same surface roughness.

In at least one embodiment, the outside of the tubular banderole comprises a greater surface roughness than the inside of the tubular banderole. The static friction or surface roughness of the banderole can be influenced, for example, by printing on its inside or outside, whereby the printed side comprises a different surface roughness than the unprinted side. Alternatively, or in addition, it is also possible to roughen the outside of the banderole, for example by mechanical methods or the action of plasma or ion beams.

In at least one embodiment, the inside of the tubular banderole is additionally printed with a bonded coating, which leads to reduced static friction. Printing, especially on the inside of the tubular banderole, comprises the advantage that the information printed on the banderole is protected from damage before the press fitting is pressed.

In at least one embodiment, the tubular banderole is made of a plastic film. Plastic films are light, inexpensive to produce, not water soluble and therefore well suited for use on a construction site.

In at least one embodiment, the plastic film of the tubular banderole comprises a thermoplastic material, and the tubular banderole is shrunk onto the essentially cylindrical pressing area. This embodiment allows easy application of the banderole to the pressing sleeve, if necessary, at a later date.

Suitable materials for the plastic film of the tubular banderole include stretched (pre-stressed) or oriented polystyrene (OPS), polyethylene terephthalate (PET), polylactides (PLA) and polyvinyl chloride (PVC). Such plastic films are relatively brittle at normal temperature and/or comprise a low coefficient of elongation. This ensures that the plastic material of the banderole is reliably destroyed during compression.

In different embodiments, the plastic film of the tubular banderole is designed as single-layer or multi-layer plastic film. A single-layer film is particularly cost-effective and easy to handle. By choosing different materials, for example for the outside and inside of a two-layer plastic film, its roughness or static friction can be influenced as desired. In addition, a multi-layer film makes it possible to protect a print of the banderole from damage on both sides by placing a print between two film layers.

In at least one embodiment, the plastic film of the tubular banderole comprises a thickness between 10 and 200 µm, preferably between 35 and 90 µm, for example 40, 45 or 50 µm. In general, the film should be selected as thin as possible from a material engineering point of view.

In at least one embodiment, the tubular banderole is made from a paper strip. Paper strips are light, inexpensive and environmentally friendly in production and disposal.

In at least one embodiment, the tubular banderole comprises no predetermined breaking point and is at least partially destroyed, in particular squeezed, alone by the forces occurring during pressing. This has the advantage that accidental tearing of the film before pressing is practically impossible.

In at least one alternative embodiment, the tubular banderole comprises at least one perforation line, incision and/or recess. The provision of such areas, which serve as predetermined breaking points, ensures a particularly reliable destruction of the film. At the same time, they allow any air inclusions between the film and the press sleeve to escape during production of the press fitting. In addition, a perforation line extending axially or helically can also be used to remove the tubular banderole manually from the press sleeve if necessary, without the need for an additional tool, such as a knife.

In at least one embodiment, the tubular banderole covers essentially the entire pressing area. This prevents unevenness between a surface of the pressing tool and the surface of the pressing sleeve covered by the banderole.

In at least one embodiment, the press sleeve comprises at least one first viewing window and the at least one tubular banderole comprises a second viewing window corresponding to the first viewing window. The two inspection windows are arranged in such a way that it is possible to see whether a pipe end has been completely inserted into the press fitting. These features allow a manual inspection when inserting a pipe before pressing the press fitting. For example, the tubular banderole can be made transparent at least in the second region of the viewing window.

In an alternative embodiment, the press sleeve comprises at least one viewing window and the tubular banderole does not cover the pressing area of the press sleeve at least in the part where the viewing window is located. Thus, even in this embodiment, it is possible to see whether a pipe end has been completely inserted into the press fitting without removing the tubular banderole.

In at least one embodiment, the tubular banderole comprises at least one technical specification regarding the type, the assembly or the use of the press fitting. Such information may, for example, relate to the diameter of a pipe to be connected to the fitting, an area of application for the pipe, such as for use in gas, hot or cold water installations, or may contain information regarding a tool, pressing pressure or other technical features required for pressing. In this way, a fitter on site can safely select the correct press fitting, avoid confusion between pipes and fittings to be connected and press the press fitting in the correct manner.

In at least one embodiment, the technical specification comprises an indication of use and/or diameter in the form of a color marking. Alternatively, or additionally, the at least one technical specification comprises a machine-readable marking, in particular a bar code or a two-dimensional data matrix, wherein the machine-readable marking contains a reference to further technical information stored in a data network. Such information is particularly helpful in providing technical data that is independent of language or can be internationalized.

In at least one embodiment, the press fitting comprises a retaining ring, whereby the retaining ring is arranged at an end of the press sleeve opposite the protruding guide element and limits the pressing area in the axial direction. Thus, the pressing area is clearly limited axially in both directions, which in particular ensures a safe positioning of the pressing tool and thus a safe pressing of the press sleeve.

In at least one embodiment, the protruding guide element is arranged at a distal, open end of the press sleeve for receiving a tube, and the retaining ring is arranged at a proximal end of the press sleeve. The press sleeve is held to the fitting body of the press fitting by the retaining ring. Such an arrangement allows easy and quick assembly of the press fitting and accurate positioning of a press tool.

In at least one embodiment, the press sleeve comprises a circumferential bead or groove in the area of the proximal end, which engages with the retaining ring.

In at least one embodiment, the retaining ring comprises at least one window, which is arranged in such a way that it can be seen whether a pipe end has been completely inserted into the press fitting. This can provide an additional or alternative means of inspecting an inserted pipe end.

In at least one embodiment, the retaining ring and/or the protruding element are designed to guide a press jaw of a press tool. A guiding function for the pressing tool and a holding function for the banderole are combined in one element.

In at least one embodiment, the protruding element is designed as a circumferential flange.

According to a second aspect of the present invention, a manufacturing process for a press fitting, in particular a press fitting according to the first aspect, is described. The manufacturing process comprises the following steps:

Applying a tubular banderole to a substantially cylindrical pressing area of a press sleeve with at least one projecting element, the tubular banderole being arranged rotatably with respect to a surface of the press sleeve, being held in the substantially cylindrical pressing area by the at least one projecting element and being at least partially destroyed during pressing of the press sleeve with a pressing tool; and Fixing the press sleeve to a fitting body.

In at least one embodiment, the step of applying the tubular banderole is performed before the step of fixing the press sleeve to the fitting body. This simplifies the production of pre-assembled sleeve assemblies that can be used on different fitting bodies.

In at least one alternative embodiment, the step of fixing the press sleeve to the fitting body is performed before the step of applying the tubular banderole. This enables the attachment of an invention-appropriate pressing marking to already finished press fittings.

In at least one embodiment, the tubular banderole is made of a plastic film and comprises a thermoplastic material. The method additionally comprises heating the tubular banderole so that the plastic film is shrunk onto the substantially cylindrical pressing area, wherein a temperature and/or a duration of the heating is selected such that the tubular banderole is arranged to be twistable relative to the surface of the pressing sleeve after cooling. With the measures described, the banderole can be applied to the press sleeve easily and mechanically.

In at least one embodiment, the diameter of the tubular banderole is selected such that the tubular banderole can be applied to the substantially cylindrical pressing area before heating via the at least one projecting element and the tubular banderole is held in the substantially cylindrical pressing area after heating by the at least one projecting element. Thus, in particular, subsequent application of the tubular banderole on a preformed or pre-assembled pressing sleeve is possible.

The step of fixing the press sleeve to the fitting body comprises in at least one embodiment the application of a retaining ring to the press sleeve and the connection of the fitting body to the retaining ring. The retaining ring can also serve as a limitation of the essentially cylindrical pressing area.

For example, the retaining ring can be injection moulded onto the press sleeve or the fitting body and before the fitting body or the press sleeve is locked with the retaining ring. Such a manufacturing process enables a particularly simple and time-saving production and assembly of the press fitting.

According to one embodiment, the manufacturing process additionally includes the step of joining two opposite edges of a carrier material, in particular a plastic film, so that the carrier material, comprising a tube, forms the tubular band. For example, the two opposite edges of a plastic film are glued or welded together.

According to one embodiment, the tube comprises a plurality of tubular banderoles, and the method further comprises the step of separating the plurality of tubular banderoles. In this way, a plurality of tubular banding is efficiently produced from a single web of a carrier material.

In at least one embodiment, the manufacturing process additionally comprises the step of printing on at least one side of the carrier material. In this way, a tubular banderole with printed information can be produced from a flat printable carrier material. An offset or laser printing process is particularly suitable for this purpose.

In at least one embodiment, a material of the tubular banderole, in particular the plastic film, is perforated. If necessary, this step can already be carried out before the two opposite edges are joined.

Further advantageous aspects and embodiments of the present invention are disclosed in the following description of exemplary embodiments and the attached patent claims.

BRIEF DESCRIPTION OF DRAWINGS

FIGS. 1A, 1B and 1C show a first embodiment of a press fitting according to the invention, FIG. 8 is a flow chart of a method for manufacturing a press fitting according to the invention.

DETAILED DESCRIPTION OF EMBODIMENTS

Figure 2:
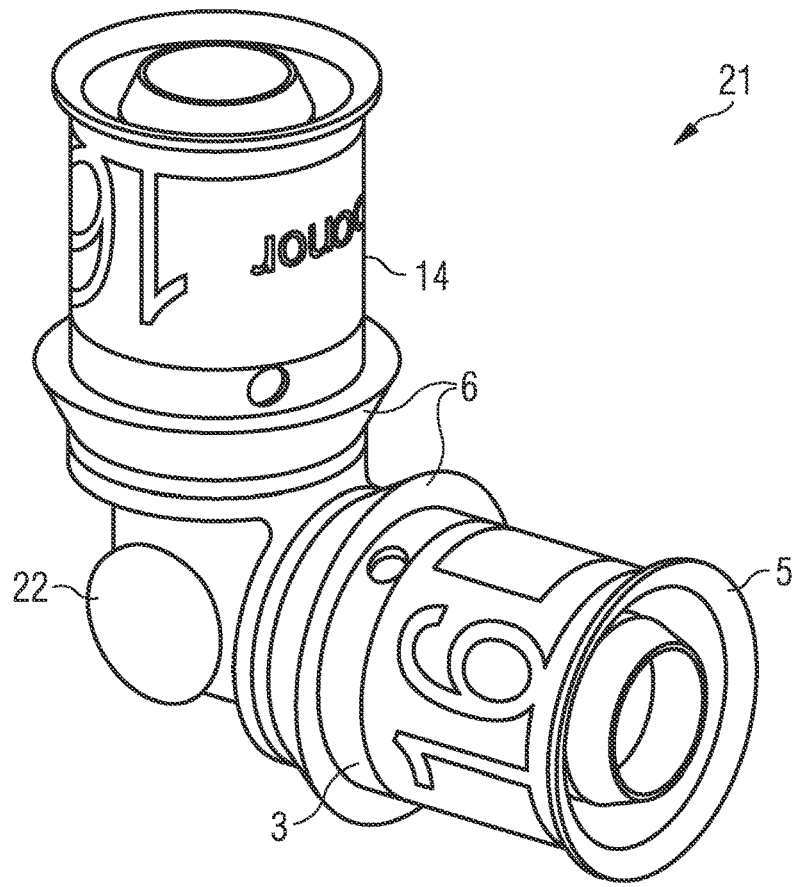
FIG. 2 is a second embodiment of a press fitting according to the invention.

FIGS. 1A, 1B and 1C show different views of a press fitting 1 according to a first embodiment of the invention. FIG. 1A shows a perspective view of the assembled press fitting 1, FIG. 1B shows a top view through the center cut press fitting 1, and FIG. 1C shows a sectional view along a central sectional plane of the press fitting 1.

As can be seen in FIGS. 1B and 1C in particular, press fitting 1 is designed to be particularly slim and material-saving. This is achieved by various features, which are described in detail below.

FIGS. 1A to 1C show that the press fitting 1 essentially comprises a fitting body 2 for connecting the press fitting 1 to a pipe not shown in FIGS. 1A to 1C, for example a metal, plastic or metal-plastic composite pipe, and a press sleeve 3 fixed to the fitting body 2 with an essentially cylindrical pressing area 4. Especially in the case of metal-plastic composite pipes, it is desirable for mechanical reasons that the pipe is pushed over part of the fitting body 2. This part of the fitting body 2 serves as a support sleeve when pressing the pressing sleeve 3. In the exemplary embodiment, the fitting body 2 is rotationally symmetrical with respect to its longitudinal axis and mirror-symmetrical with respect to a perpendicular central plane with two opposite connections for producing a straight pipe connection. Depending on the diameter of the press fitting 1 and the fluid to be passed through, the fitting body 2 can be made of a plastic material, such as polyphenylene sulfone (PPSU), or a metal material preferably suitable for drinking water, such as in particular a tin-plated copper alloy or stainless steel.

The pressing sleeve 3 consists essentially of a hollow piece of metal sheet, for example of stainless steel. The cylindrical pressing area 4 of the embodiment described is smooth before pressing, i.e. it comprises no protruding ribs or embossed depressions, thus contributing to the particularly slim design and material and resource-saving manufacture of press fitting 1. In principle, the provision of protruding ribs on the press area 4 is also possible. However, due to the direct effect of the press tool on a sealing area, contouring of the press sleeve 3 is not necessary. The press area 4 is limited in the axial direction at the distal end of the press fitting 1 by an outwardly bent flange 5 of the press sleeve 3. At the opposite, proximal end, the press area 4 is limited by a retaining ring 6.

In the described exemplary embodiment, the retaining ring 6 is a plastic injection-molded part. The retaining ring 6 is used to fix the press sleeve 3 to the fitting body 2. For this purpose, the press sleeve 3 comprises a slightly widened area 7 at the proximal end, which is locked to the retaining ring 6. The retaining ring 6 also engages with the fitting body 2 via two opposite locking lugs 8 and 9. There is no need to slit or otherwise process the press sleeve 3. If the fitting body 2 and the press sleeve 3 are made of metal materials, the retaining ring 6 is also used to provide galvanic isolation.

To seal a fluid-conducting connection between a pipe and the press fitting 1, two circumferential recesses 10 are incorporated in the fitting body 2, which serve to accommodate the corresponding sealing rings 11. A web 12 between the two adjacent recesses 10 recedes in relation to a surface of the adjacent pressing profile 13 of the fitting body 2. This embodiment of the pressing profile 13 allows, among other things, the use of sealing rings 11 with a reduced diameter, while retaining the required sealing function. Accordingly, the wall thickness of the fitting body 2 can also be reduced for the same pipe diameter of a pipe to be pressed, so that the pressure loss coefficient is reduced when a fluid, also known as the so-called zeta value, flows through the press fitting 1.

A further feature, which contributes to the particularly slim embodiment of the press fitting 1, is a tubular banderole 14 applied to the press sleeve 3. The tubular banderole 14, as explained below, serves in particular as a pressing marking for the connections of the press fitting 1. In this way, the provision of an additional plastic ring in the pressing area 4, which serves as a pressing marking, can be dispensed with.

In the described exemplary embodiment, the banderole 14 consists essentially of a thermoplastic material, in particular of pre-stressed oriented polystyrene (OPS), which was shrunk onto the press area 4 of the press sleeve 3 by heating. The banderole 14 is heated until the banderole 14 is just about twistable, fully or partially resting on the press sleeve 3, but can no longer be pulled off the press sleeve 3 via the flange 5.

Alternatively, the banderole 14 can also be made of paper or another tubular, non-shrinkable material. Instead of shrinking, such a banderole can be produced by gluing a strip of material, for example a foil or paper strip, to form a ring. Regardless of the selected material and manufacturing process, the banderole 14 loosely surrounds the press sleeve 3 in the finished state.

Such a loose connection between the banderole 14 and the press sleeve 3 ensures that the banderole 14 is largely fixed on the press fitting 1 in the axial direction, but can still be moved in the tangential direction, especially when pressing the press sleeve 3. The loose connection supports the destruction of the banderole 14 as described in detail later. In the exemplary embodiment, the banderole 14 can be rotated relative to the press sleeve 3 without using a tool. For example, it sits so loosely on the press sleeve 3 that the revenue stamp 14 is taken along by a finger running tangentially over its surface.

The banderole 14 not only serves as a crimping identification but also carries a number of specifications that are useful for identifying the press fitting 1. In the exemplary embodiment shown in FIG. 1A, it can be seen, for example, that the banderole 14 comprises an indication of the diameter of a pipe to be pressed with press fitting 1 in the form of a numerical indication 15, a manufacturer's indication 16 in the form of a mark, a machine-readable marking 17 in the form of a QR code and a color marking 18 in the form of a strip.

The color marking 18 enables an easily recognizable coding of the pipe diameter and/or an indication of use for different pipelines, for example pipelines for gas or water.

The machine-readable marking 17 can be used to obtain further technical information about the press fitting 1 by means of a suitable reader, e.g. a smartphone with a built-in camera or an electronic pressing tool with a built-in barcode reader. For example, it is possible to display installation instructions or a data sheet for press fitting 1 to an installer on a smartphone or similar mobile device. Such markings 17 can also be used to implement automated reporting of the pressing of a large number of press fittings 1 on a construction site or to collect bonus points when processing appropriately marked press fittings 1. The machine-readable marker 17 can also contain a link to a special application or app that can be used to obtain more information about or certificates for press fitting 1 or to collect bonus points.

Finally, the banderole 14 can also refer to special events or actions of a manufacturer or seller via appropriate imprints.

In the exemplary embodiment shown in FIGS. 1A to 1C, the tubular banderole 14 covers the press area 4 to a large extent, i.e. more than half, preferably more than three quarters, and even more preferably almost completely. However, it does not completely reach the retaining ring 6. As shown in FIG. 1B in particular, an inspection window 20 in the form of a bore hole is incorporated in the pressing sleeve 3 in an intermediate area 19 between the banderole 14 and the retaining ring 6. Through the inspection window 20, a fitter can see whether a pipe end has been completely inserted into the press fitting 1 before starting the pressing process. The banderole 14 does not obstruct the view of the viewing window 20 and the pipe end below.

FIG. 2 shows another embodiment of a press fitting 21 according to the present invention. Press fitting 21 is an elbow-shaped press fitting for connecting two pipes. Accordingly, the fitting body 22 is designed as an angle piece. The two connections of the press fitting 21 correspond essentially to the connections of the straight-line press fitting 1 according to FIGS. 1A to 1C and are therefore not described again here.

Figure 3:
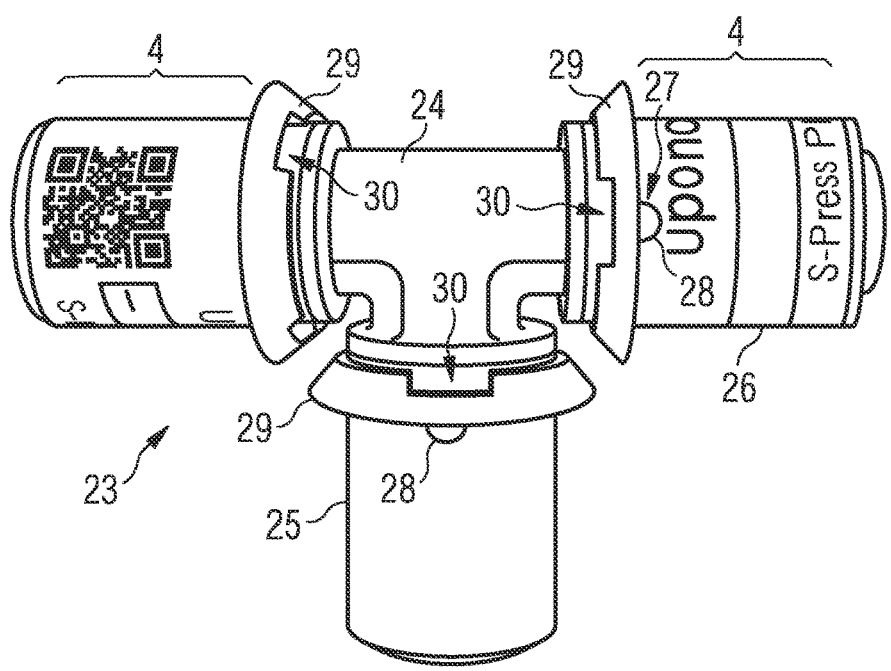
FIG. 3 is a third embodiment of a press fitting according to the invention, FIGS. 4A and 4B different sections of a cross section of the press area of a press fitting according to the invention, FIGS. 5A, 5B and 5C provide perspective views of a press fitting according to the invention during and after a pressing process, FIGS. 6A and 6B different printing templates for banderoles of press fittings according to the invention.

FIG. 3 shows another press fitting 23 in the form of a connector. A T-shaped fitting body 24 has three connections for pipe connections. These correspond largely to the connections of the straight press fitting 1 as shown in FIGS. 1A to 1C. However, three press sleeves 25 of press fitting 23 are slightly flared at their distal end but do not comprise a flange as shown in FIGS. 1A to 1C and 2. Furthermore, a banderole 26 at the left and right connection of press fitting 23 covers the entire press area 4. No banderole was applied to the lower connection of press fitting 23 to show the press sleeve 25 below.

To enable inspection of a pipe end inserted in the press sleeve 25, a plastic film of the banderole 26 is transparent at the right connection. Thus, the banderole comprises a transparent viewing window 27 at its proximal end, which provides a view of a U-shaped cutout 28 of the press sleeve 25 below.

In addition, a retaining ring 29 comprises a window 30 in the area of the U-shaped cutout 28 on a side opposite the press area 4. The window 30 also allows a visual inspection of a pipe end during insertion and crimping, from a different viewing angle than the transparent viewing window 27. In addition, it allows a crimping inspection even if a non-transparent plastic film is used for the banderole 26, as shown on the left connection of the press fitting 23.

Figure 4A:
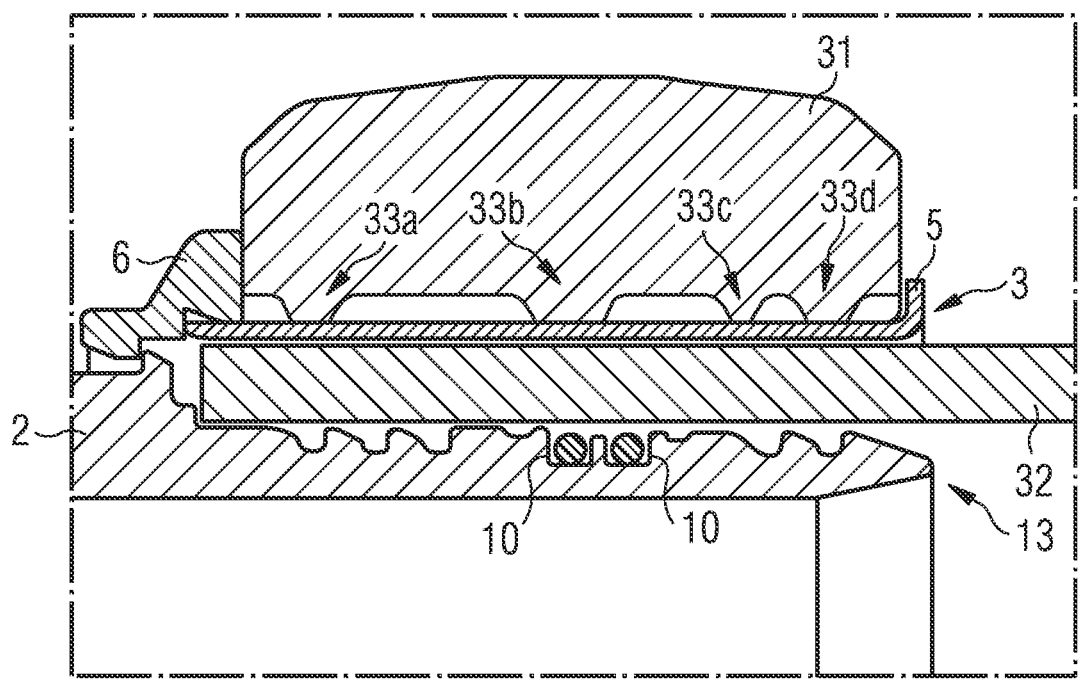
Figure 4B:
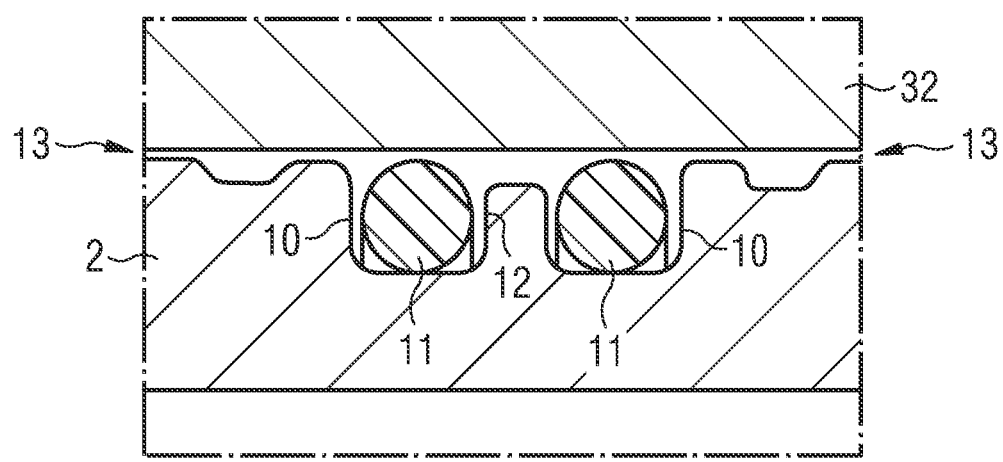

FIGS. 4A and 4B schematically show the embodiment of the pressing profile 13 of the fitting body 2 and an associated press jaw 31 of a suitable compression tool. FIG. 3A shows a first cut-out comprising the pressing jaw 31 of the pressing tool not shown and FIG. 3B shows an enlargement of the first cut-out in a sealing area of the fitting body 2. In the state shown in FIGS. 4A and 4B, a pipe end 32 has been completely inserted into a connection of the press fitting 1. However, pressing by the press tool has not yet taken place.

As can be seen in particular in FIG. 4A, the press jaw 31 covers the entire pressing area 4 between the distal flange 5 and the proximal retaining ring 6, thus enabling easy and accurate positioning of the press jaw 31 on the press sleeve 3, with the press jaw 31 being guided on both sides by the flange 5 and the retaining ring 6. The press jaw 31 comprises several protruding areas 33a to 33d. In particular, a second projecting region 33b is positioned directly opposite one of the two recesses 10 with a sealing ring 11 accommodated therein. The second region 33b is located exactly in the middle of the pressing jaw 31 so that it maintains its position even if the pressing tool is turned. The second recess 10 with the second sealing ring 11 serves as a further safety feature in case the pressing jaw 31 should be positioned too far forward on the press fitting 1 despite the flange 5. The high pressing forces in the protruding areas 33a to 33d of press jaw 31 preferably support the destruction of the banderole 14.

As can be seen in particular in FIG. 4B, in the cross section the web 12, which separates the two corresponding recesses 10 for receiving the sealing rings 11 from each other, is lower than the adjacent area to the right and left of the pressing profile 13 of the base body 2. The sealing rings protrude beyond the upper end of the web 12 and end essentially at the level of the pressing profile 13 lying to the left and right of it. In this way it is ensured that the pipe end 32 in this area bends evenly, especially S-shaped, and can be pressed onto the fitting body 2 with certainty to such an extent that a sealing connection is created between the pipe end 32, at least one of the sealing rings 11 and the fitting body 2.

Compared to the use of a single sealing ring with a larger cross section, the wall thickness of the fitting body 2 can be reduced for the same pipe diameter of a pipe end 32 to be pressed on, so that the pressure loss coefficient is reduced when a fluid flows through the press fitting 1.

FIG. 5A shows a perspective view of a press fitting 1 during a pressing operation with a pressing tool 34. During the pressing process, the pressing jaws 31 of the pressing tool 24 are brought together, hydraulically if necessary, so that they reduce their inner diameter. This creates a high contact pressure between the press jaws 31 and the banding 14 surrounding the press sleeve 3. By reducing the diameter of the press jaws 31, a tangential force is effectively exerted on the banding 14, so that part of the plastic film is transported into the closing area of the press jaws 31. In particular, excess material, which is partly due to the loose fit of the banderole 14 and partly to the reduction of the diameter of the pressing sleeve 3 during pressing, is transported to the closing level of the pressing tool 34 and forms a gusset there. The gusset is pressed or destroyed by the closing pressing jaws 31. This leads to damage and usually even to tearing of the banderole 14, which is at least partially destroyed and serves as a pressing marking in the described exemplary embodiment.

Figure 5B:
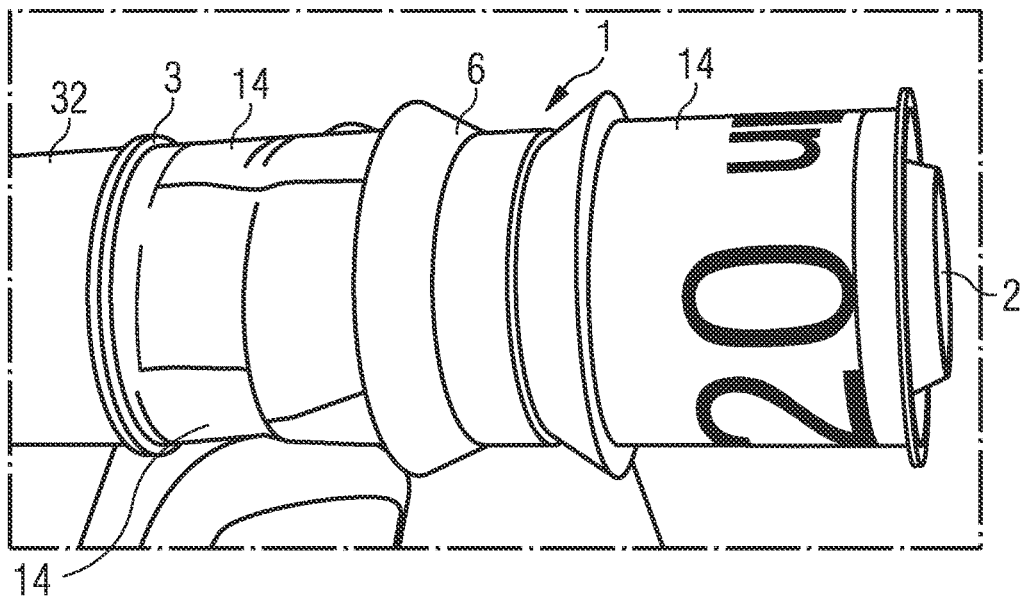
Figure 5C:
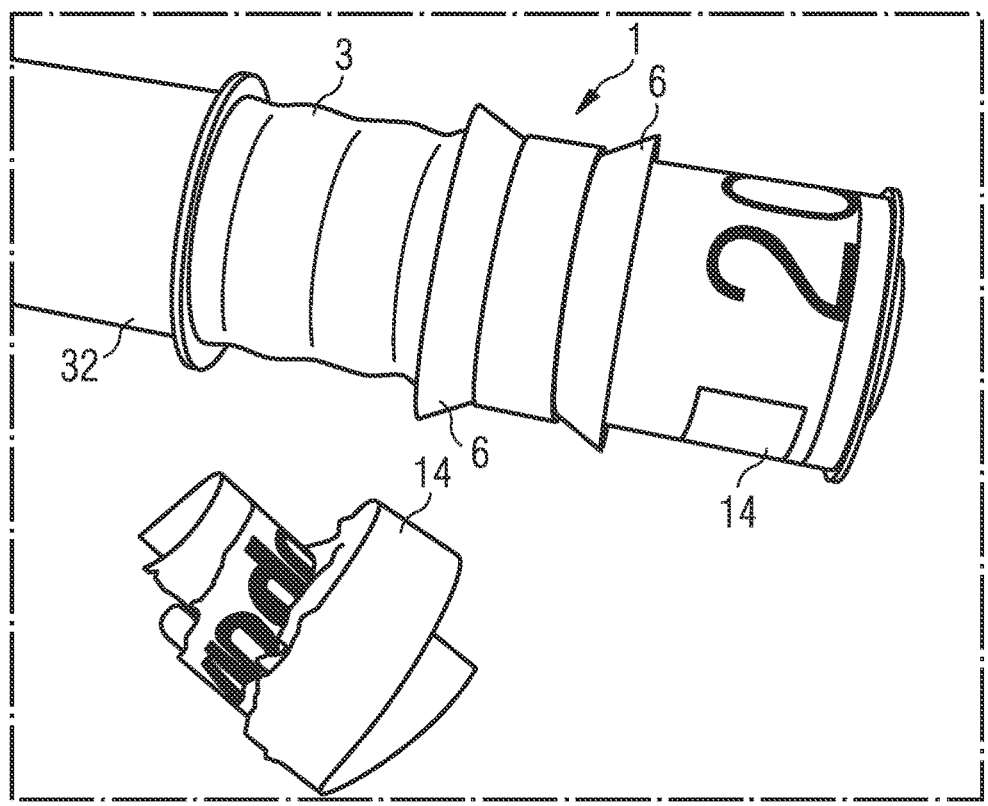

The condition immediately after removal of the pressing tool 34 after pressing is shown in FIG. 5B. It shows that the banderole 14 still surrounds the pressed pressing sleeve 3 for the most part but comprises a crack in the axial direction. Thus, the damaged banderole 14 falls off the press sleeve 3 after pressing or can at least be easily removed from the press sleeve 3 by two fingers of a fitter to indicate a successful pressing of the press fitting 1. This condition is shown in FIG. 5C. Also shown in FIG. 5C is that the diameter of the press sleeve 3 has been reduced especially in the protruding areas of the press jaw 31 of a press tool 34 in order to ensure a tight connection.

In contrast to many known press fittings, the retaining ring 6 remains on the pressed fitting 1, and since it is located outside the pressing area 4, it is not destroyed during the pressing process. This has the advantage that there are no plastic fragments on the construction site which could lead to a blocking of the pressing tool.

Although this cannot be seen in FIGS. 1A to 5C, the tearing or manual removal of an only partially destroyed banderole 14 can be facilitated by the provision of suitable predetermined breaking points. For example, it is possible to bring in a perforation line running in an axial or helical direction in the banderole 14. Such a perforation line is not absolutely necessary to destroy the banderole 14 during pressing. However, it also helps to shrink the banderole 14 onto the pressing sleeve 3 by allowing controlled escape of air inclusions underneath. Instead of perforations, corresponding recesses or cuts can also be provided in the banderole 14.

Figure 6A:
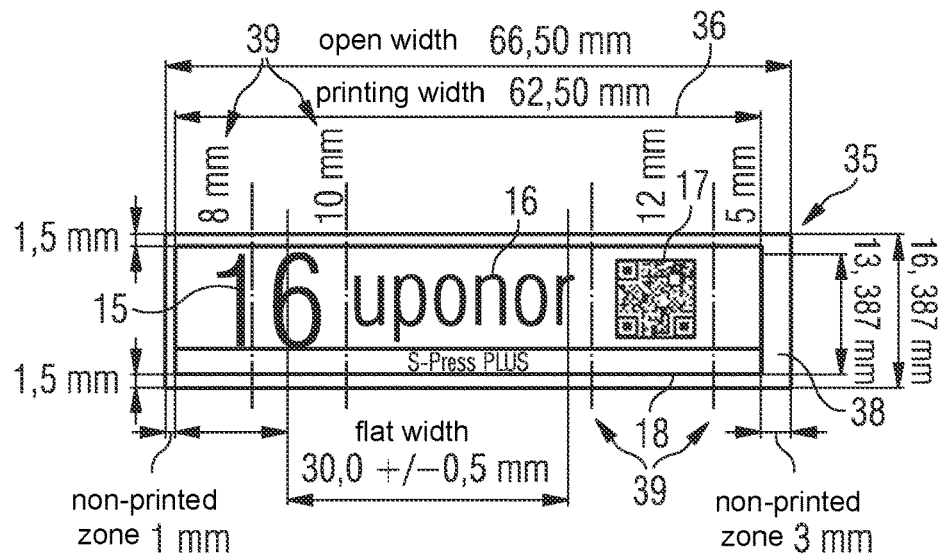
Figure 6B:
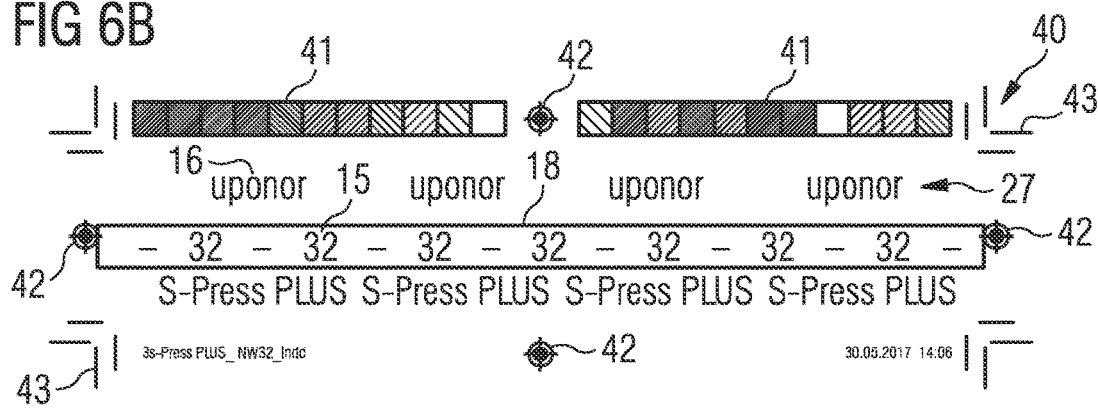

FIGS. 6A and 6B show different printing templates for producing a banderole that serves as a pressing marking.

FIG. 6A shows an initial template for a flat film 35 to produce a marking for a press fitting with a pipe diameter of 16 mm. A pressure range 36 comprises the specifications 15, 16, 17 and 18 already specified with reference to FIG. 1. An upper and lower edge area 37 of the film 35 is not printed in the described exemplary embodiment and is therefore potentially available for a transparent viewing window. A lateral unprinted zone 38 is used for bonding the film 35 to the tubular banderole 14.

As shown in FIG. 6A, the film 35 comprises four perforation lines 39, which are produced in the form of fine needle punctures in the film 35. After rolling up the film 35 as a tubular banderole, these run in the axial direction and thus allow air to escape between film 35 and the pressing sleeve 3 during shrinking and pressing with the pressing tool, as well as making it easier to destroy the banderole in the tangential direction. In particular, the provision of at least one perforation line prevents air bubbles trapped during a pressing process from reaching the closing plane of the pressing jaw 31 and exploding there. This would lead to unwanted noise and possibly to film particles flying around.

FIG. 6B shows an alternative embodiment of a film 40 for a 32 mm diameter tube fitting. In contrast to foil 35 shown in FIG. 6A, film 40 has no machine-readable markings printed on it. In addition, the artwork as shown in FIG. 6B shows different color patterns 41 and position marks 42, which are used to precisely position the imprint on the film 40. Cutting marks 43 specify where the film 40 must be cut to produce individual banderoles 26.

In the described exemplary embodiment, the films 35 and 40 are printed on one side in an offset printing process. Printing the films 35 or 40 with a corresponding coating reduces the static friction of the printed side of the film 35 or 40. A further reduction in static friction can be achieved by printing with a special sliding coating.

The films 35 or 40 are then rolled up into tubular banderoles 14 or 26 by joining the lateral edge areas 37 so that the printed surface is on the inside of the banderole 14 or 26. This ensures that the printing on the films 35 and 40 is protected against damage during transport of the press fittings 1, 21 and 23 respectively.

At the same time, the static friction between the press sleeve 3 or 25 and the banderole above it is reduced compared to the static friction between the outside of the banderole 14 or 26 and a press jaw 31 of a pressing tool 34. As a result, the banderole 14 or 26 is carried along tangentially by the pressing jaws 31 during pressing of the press sleeve 3 or 25 and slides on the surface of the press sleeve 3 or 25, so that reliable destruction of the banderole 14 or 26 is ensured.

Figure 7:
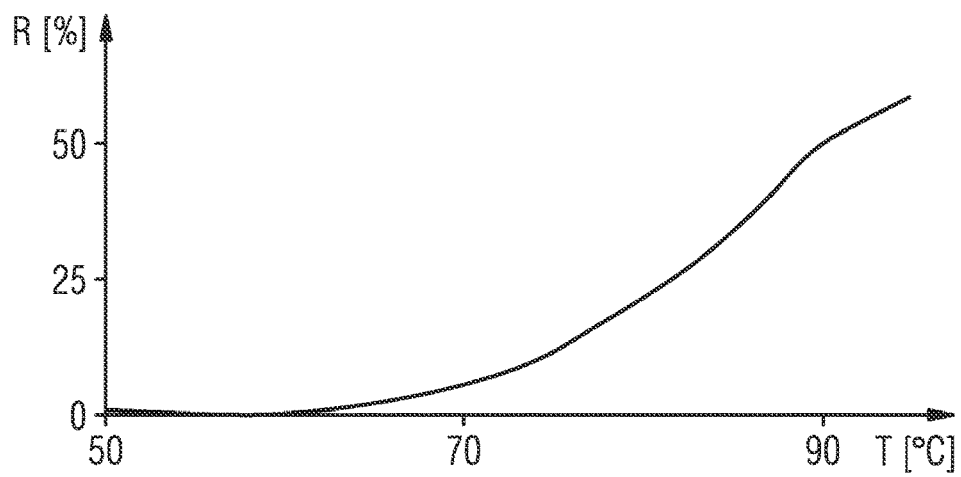
FIG. 7 illustrates a shrinkage curve of a suitable thermoplastic film for the production of a banderole.

The radial twistability of the banderole 14 or 26 required for this can be ensured alternatively or additionally by a suitable selection of a temperature or duration of a shrinking process. FIG. 7 shows a schematic shrinkage curve of a thermoplastic material. As a function of a prevailing temperature T between 50 and 95° C., a deterministically predictable shrinkage ratio R results for a given shrinking time, for example 10 seconds. Depending on the inner diameter of the tubular banderole 14 or 26 before a shrinking process and the outer diameter of the pressing sleeve 3 or 25, the temperature is selected in such a way that the banderole 14 or 26 can still be twisted in the radial direction after the shrinking process.

FIG. 8 schematically shows the process steps for the manufacture of a press fitting according to an embodiment of the invention, in particular press fitting 1 according to FIGS. 1A to 1C.

In a step S1, a plastic film is first printed with a suitable printing template. For example, an initially flat OPS plastic film can be printed with one of the templates shown in FIG. 6A or 6B. An offset or laser printing process is suitable for this.

Then, the edge areas 37 of the printed film 35 or 40 are rolled up to form a film tube. The two edge areas are then joined together in a step S2, for example welded or glued.

In a preferred embodiment, several markings of the same type are printed on top of each other on an elongated film web. In this way, a large number of banderoles 14 or 26 can be produced simultaneously. In a subsequent, optional step S3, these are separated from each other by cutting at predetermined separation planes.

The individual banderoles 14 or 26 produced in this way are applied to a pressing sleeve 3 or 25 in a step S4. For example, the banderole 14 can be applied on the back side over the expanded area 7 to the press sleeve 3 as shown in FIGS. 1A to 1C. In an optional step, a lubricant, such as oil, wax or a water or other fluid film, can be brought in between the press sleeve 3 or 25 and the banderole 14 or 26.

In a step S5, the banderole 14 or 26 is heated at a predetermined temperature for a predetermined time so that the thermoplastic film contracts. For example, the time can be selected or determined by a duration of one pass through a process oven. The temperature and/or duration of the heating step is selected so that the banderole 14 or 26 lies loosely on the pressing sleeve 3 or 25 at the end of the heating. Preferably, the banderole 14 or 26 is already held securely in this state in axial direction on the press sleeve 3 or 25, for example between the expanded area 7 and the flange 5. When passing through the process furnace, the press sleeve 3 or 25 heats up only slightly. Due to the relatively large mass and thermal capacity of the press sleeve 3 or 25, the shrinking process ends at the latest when the banderole 14 or 26 comes into contact with the cool press sleeve 3 or 25. Additional cooling of the banderole 14 or 26 to end the shrinking process is therefore not necessary.

In an optional modification, the press sleeve 3 or 25 with the banderole 14 or 26 is cooled suddenly, for example, by using a water bath. Such a procedure prevents subsequent, unintentional shrinking of the banderole material. Any remaining water between the pressing sleeve 3 or 25 and the banderole 14 or 26 also serves as a lubricant.

In a subsequent step S6, a retaining ring 6 or 29 is attached to the press sleeve 3 or 25. This can be done, for example, by locking the retaining ring 6 or 29 with the press sleeve 3 or 25 or by injecting the retaining ring 6 or 29 directly onto the press sleeve 3 or 25 as an injection molded part. This is the latest way to secure the banderole 14 or 6 axially in both directions.

In a step S7, the press sleeve 3 or 25 is attached to the fitting body 2, 22 or 24. In the exemplary embodiment, this is done by pushing the entire sleeve assembly onto the fitting body 2, 22 or 24 and locking it there. Of course, it is also possible to reverse these steps, i.e. spraying or locking the retaining ring 6 or 29 directly onto the fitting body 2, 22 or 24 and locking the retaining ring 6 or 29 with the press sleeve 3 or 25.

In an alternative embodiment of the method, the banderole 14 or 26 is only applied to the press sleeve 3 or 25 after the other press fittings 1, 21 or 23 have been assembled. Here, the inner diameter of the not yet shrunk banderole 14 or 26 is selected so large that it can be pushed onto the press sleeve 3 or 25 via a projecting element at the distal end of the press sleeve 3 or 25, in particular flange 5 of the press sleeve 3. In the heating step, the banderole 14 or 26 shrinks together until it is held in the pressing area 4 by the projecting element. In this case, steps S6 and S7 are performed before steps S4 and S5.

In another alternative embodiment of the method, the banderole 14 or 26 is not shrunk onto the press sleeve 3 or 25. Instead, the inner diameter of the banderole 14 or 26 before the banderole 14 or 26 is applied to the press sleeve 3 or 25 essentially corresponds to the outer diameter of the press sleeve 3 or 25. In this case, step S5 is omitted without replacement.

Instead of the above-mentioned plastic film, another non-shrinkable carrier or banderole material, for example a paper sheet, can be used in steps S1 to S3 to produce banderoles 14 or 26.

For example, an already closed, tubular banderole 14 or 26 can be pushed from the proximal end onto the press sleeve 3 or 25 before the press sleeve 3 or 25 is attached to the fitting body 2 in step S7. Alternatively, a material strip, e.g. a paper strip, can be guided around the press sleeve 3 or 25 and only then be glued overlapping to form a tubular banderole 14 or 26.

In all cases described, the banderole 14 or 26 is fixed in the finished state of the press fitting 1, 21 or 23 in the axial direction by projecting parts of the press fitting 1, 21 or 23, in particular the flange 5 or another projecting area at the distal end and by the retaining ring 6 or another projecting area at the proximal end.

LIST OF REFERENCES MARKS 1 press fitting
2 fitting bodies
3 press sleeve
4 press area
5 flange
6 retaining ring
7 expanded range
8 locking lug (of the retaining ring 6)
9 locking lug (of fitting body 2)
10 recess
11 sealing ring
12 web
13 pressing profile
14 banderole
15 numerical information
16 manufacturer information
17 machine-readable marking
18 color marking
19 intermediate area
20 viewing window
21 press fitting
22 fitting body
23 press fitting
24 fitting body
25 press sleeve
26 banderole
27 transparent viewing window
28 u-shaped recess
29 retaining ring
30 windows
31 press jaw
32 pipe end
33 protruding area
34 press tool
35 film
36 print area
37 edge area
38 unprinted zone
39 perforation line
40 film
41 color samples
42 position marking
43 cutting mark

The invention claimed is:
1. A press fitting for a pipe connection comprising:
a fitting body for connecting the press fitting to a pipe;
a press sleeve separate from and fixed to the fitting body and having a substantially cylindrical pressing area and at least one projecting element which delimits the substantially cylindrical pressing area in the axial direction; and
a tubular banderole which surrounds the substantially cylindrical pressing area of the press sleeve, the tubular banderole being arranged rotatably with respect to a surface of the press sleeve, being held in the cylindrical pressing area by the at least one projecting element and being at least partially destroyed when the press sleeve is pressed with a pressing tool,
wherein the tubular banderole is made of at least one of a plastic film and a paper strip.

2. The press fitting according to claim 1, wherein at least one of the tubular banderole and the press sleeve is designed or arranged on top of one another in such a way that a static friction between an inner side of the tubular banderole and the surface of the press sleeve is lower than a static friction between an outer side of the tubular banderole and a surface of a pressing jaw of the pressing tool during pressing.

3. The press fitting according to claim 2, wherein the outside of the tubular banderole comprises a greater surface roughness than the inside of the tubular banderole.

4. The press fitting according to claim 2, wherein:
at least one of the inner side and the outer side of the tubular banderole is printed, and a printed side comprises a different surface roughness than an unprinted side.

5. The press fitting according to claim 1, wherein the tubular banderole does not comprise any predetermined breaking point.

6. The press fitting according to claim 1, wherein a plastic film of the tubular banderole comprises at least one of oriented polystyrene (OPS), polyethylene terephthalate (PET), polylactides (PLA) and polyvinyl chloride (PVC).

7. The press fitting according to claim 1, wherein the plastic film of the tubular banderole is designed as a single-layer or multi-layer plastic film.

8. The press fitting according to claim 1, wherein the plastic film of the tubular banderole comprises a thickness between 10 and 200 μm.

9. A press fitting for a pipe connection, comprising:
a fitting body for connecting the press fitting to a pipe;
a press sleeve fixed to the fitting body and having a substantially cylindrical pressing area and at least one projecting element which delimits the substantially cylindrical pressing area in the axial direction;
a tubular banderole which surrounds the substantially cylindrical pressing area of the press sleeve, the tubular banderole being arranged rotatably with respect to a surface of the press sleeve, being held in the cylindrical pressing area by the at least one projecting element and being at least partially destroyed when the press sleeve is pressed with a pressing tool; and
a retaining ring, wherein the retaining ring is arranged at an end of the press sleeve opposite the projecting element and limits the pressing area in axial direction.

10. The press fitting according to claim 9, wherein:
the tubular banderole comprises at least one of a perforation line, a cut and a recess.

11. The press fitting according to claim 9, wherein the at least one projecting element is arranged at a distal open end of the press sleeve for receiving a pipe and the retaining ring is arranged at a proximal end of the press sleeve, and the press sleeve is held by the retaining ring on the fitting body of the press fitting.

12. The press fitting according to claim 11, wherein:
the press sleeve comprises at least one of a circumferential bead and a circumferential recess in a region of the proximal end, wherein the at least one of the circumferential bead and the circumferential recess engages with the retaining ring.

13. The press fitting according to claim 9, wherein the retaining ring is designed to guide a press jaw of the pressing tool.

14. The press fitting according to claim 9, wherein:
the at least one projecting element is designed to guide a press jaw of the pressing tool.

15. A manufacturing method for manufacturing a press fitting, the method comprising:
applying a tubular banderole to a substantially cylindrical pressing area of a press sleeve with at least one projecting element, the tubular banderole being (i) arranged rotatably relative to a surface of the press sleeve, (ii) held in the substantially cylindrical pressing area by the at least one projecting element and (iii) at least partially destroyed when the press sleeve is pressed with a pressing tool; and
fixing the press sleeve to a fitting body,
wherein the fixing of the press sleeve to the fitting body comprises:
applying a retaining ring to the press sleeve; and
connecting the fitting body with the retaining ring.

16. The manufacturing method according to claim 15, wherein:
the tubular banderole is made of a plastic film comprising a thermoplastic material; and
the method additionally comprises heating the tubular banderole, so that the plastic film is shrunk onto the substantially cylindrical pressing area, wherein at least one of a temperature and a duration of the heating is selected such that the tubular banderole, after cooling, is arranged to be rotatable relative to the surface of the press sleeve.

17. The manufacturing method according to claim 16, wherein:
a diameter of the tubular banderole is selected such that the tubular banderole can be applied to the substantially cylindrical pressing area via the at least one projecting element before being heated and the tubular banderole is held in the substantially cylindrical pressing area by the at least one projecting element after being heated.

18. The manufacturing method according to claim 15, further comprising:
joining two opposite edges of a carrier material that is a plastic film or a paper strip, so that the carrier material, comprising a tube, forms the tubular banderole.

19. The manufacturing method according to claim 18, wherein:
the tube comprises a plurality of tubular banderoles; and
the method further comprises separating the plurality of tubular banderoles.

20. The manufacturing method according to claim 15, further comprising:
printing a carrier material of the tubular banderole using an offset or laser printing process; and
perforating the carrier material of the tubular banderole.

* * * * *